(12) United States Patent
Carpenter

(10) Patent No.: US 9,700,796 B2
(45) Date of Patent: Jul. 11, 2017

(54) SYSTEM AND METHOD FOR PROGRESSING CHARACTER ABILITIES IN A SIMULATION

(75) Inventor: Jefferson Lanier Carpenter, Round Rock, TX (US)

(73) Assignee: Daybreak Game Company LLC, San Diego, CA (US)

(*) Notice: Subject to any disclaimer, the term of this patent is extended or adjusted under 35 U.S.C. 154(b) by 808 days.

(21) Appl. No.: 12/507,568

(22) Filed: Jul. 22, 2009

(65) Prior Publication Data
US 2010/0022301 A1 Jan. 28, 2010

Related U.S. Application Data

(60) Provisional application No. 61/082,666, filed on Jul. 22, 2008.

(51) Int. Cl.
A63F 13/58 (2014.01)
A63F 13/30 (2014.01)
A63F 13/537 (2014.01)

(52) U.S. Cl.
CPC .............. *A63F 13/58* (2014.09); *A63F 13/12* (2013.01); *A63F 13/537* (2014.09); *A63F 2300/535* (2013.01); *A63F 2300/65* (2013.01)

(58) Field of Classification Search
CPC ............................ A63F 2300/65; A63F 13/58
USPC ............................................... 463/1–6, 40–42
See application file for complete search history.

(56) References Cited

U.S. PATENT DOCUMENTS 7,025,675 B2 4/2006 Fogel et al.
2002/0160835 A1* 10/2002 Fujioka et al. ................ 463/31
2004/0414385 7/2004 Meyers
2004/0259614 A1 12/2004 Machida
2005/0113164 A1 5/2005 Buecheler et al.
2007/0060335 A1* 3/2007 Sakaguchi et al. ............. 463/30
2007/0298886 A1 12/2007 Aguilar, Jr. et al.
2008/0146335 A1 6/2008 Toriyama

FOREIGN PATENT DOCUMENTS

JP 09-140938 6/1997
JP 2008-043642 2/2008

OTHER PUBLICATIONS

Blockrealm, Frequently asked Questions, http://web.archive.org/web/20071110070127/http://www.blockrealm.com/gameinfo/faq.shtml, posted 2007.*
Eve Vault, "FAQ, Your Character and Eve" posted Jun. 17, 2011, http://web.archive.org/web/20070815085205/http://evevault.ign.com/faq/index.php?category=1.*
World of Warcraft game manual, Released circa 2004.*
Anarchy Online: Getting Started on the Rubi-Ka, http://www.anarchy-online.com/anarchy/frontend/files/CONTENT/gameguide.pdf, 2005.*

(Continued)

*Primary Examiner* — David L Lewis
*Assistant Examiner* — Ross Williams
(74) *Attorney, Agent, or Firm* — Lorenz & Kopf, LLP

(57) ABSTRACT

Systems and methods are provided to alter one or more characteristics of a digital object or profile, such as developing a character in an online computer game. Using the systems and methods, a user of a computer system, e.g., a player of a computer game, can control how digital objects develop over time both through the direct use of that object by the user as well as by the passage of units of time.

14 Claims, 5 Drawing Sheets

(56) References Cited

OTHER PUBLICATIONS

Mass Effect Guide/Walkthrough v1.20, Written by Eric Jewett, Mar. 24, 2008.*
Grinding Sucks—Modernizing the RPG, Jun. 13, 2008, http://mirrorsedge.wordpress.com/2008/06/13/grinding-sucks-modernizing-the-rpg/.*
"What is EVE Online?", http://www.eveonline.com/faq/faq.01.asp, EVE Online, downloaded Mar. 30, 2009, 1 page.
http://www.blockrealm.com/gameinfo/faq.shtml, BLOCKREALM, Frequently Asked Questions, downloaded Mar. 30, 2009, 6 pages.

* cited by examiner

SYSTEM AND METHOD FOR PROGRESSING CHARACTER ABILITIES IN A SIMULATION

CROSS-REFERENCE TO RELATED APPLICATIONS

This application claims the benefit of U.S. Provisional Patent Application Ser. No. 61/082,666, filed Jul. 22, 2008, entitled "CHARACTER PROGRESSION", which is incorporated by reference herein in its entirety.

BACKGROUND

Massively multiplayer online ("MMO") games enjoy tremendous popularity, with some games numbering players in the hundreds of thousands or even millions. Such games' players typically control one or more player characters; as a player plays the game, their player character generally increases in ability and power. These character attributes are often encapsulated in the form of a character level, which is a number that increases with character experience, and which is a general indicator of the ability of the character in combat, defense, or the like.

In these prior systems, progressing a player character, e.g., raising its level or increasing its combat ability, was accomplished by the process of playing the character, e.g., completing quests, performing combat, and so on. In one prior system, extra "experience points" have been given to a character following a period of non-use (so that a player could "catch up" to their friends); but these extra points are tied to new experience points gained by the character, i.e., they did not accumulate over time during the period of non-use.

SUMMARY

Implementations of the invention provide a system and method to progress (by some measure) a player character in an MMO over time. In this way, players can progress their characters not only through "game-play progression" but also through the passage of real-world time, termed "time progression". Time progression may result in an accumulation of "inactive advancement points", which may then be applied to the desired attribute. Time progression, and game-play progression, may increase a general attribute or characteristic, such as a level of a player character, or may increase a specific attribute or group of attributes. For a given character archetype and/or level, an attribute may be chosen by default for time progression, and this default may be modified by the player such that a different attribute or characteristic, of the player's choice, is progressed. Time progression of a given attribute may by synergistic and may enhance game-play progression of the same, a related, or a different attribute.

There may be many variations of this system. For example, time progression may occur only when the player is off-line or it may also include online time. Time progression of a given attribute may be enabled by character access to training facilities, possession of training items, access to mentors or experts, or the like. Time-progression implementations may incur a cost for the player, such as an in-game fee for the character, an increased risk for a negative consequence, or the like. Other variations are discussed below.

In one aspect, the invention is directed toward a computer-readable medium, comprising instructions for causing a processor in an electronic device to perform a method of progressing a player character in a simulation, the simulation including a plurality of player characters and non-player characters. The method includes: associating with a player character at least one progression variable, the progression variable having a monotonically increasing or decreasing value; after a passage of a unit of time, increasing or decreasing the value of the progression variable; and transmitting a signal to a client computing device, corresponding to the increased progression variable, the signal for causing a rendering an indication of the increased progression variable on a video or an audio device, respectively, or both.

Implementations of the invention may include one or more of the following. A signal, associated with the signal for causing a rendering, may be transmitted to a video renderer including a graphics processing unit or a video card. The associating with a player character at least one progression variable may include associating with a player character and the progression variable one or more inactive advancement points. The passage of a unit of time may include passage of a unit of time in which a player corresponding to the player character is logged into the simulation, or alternatively where the player is offline. The passage of a unit of time may include passage of unit of time in which a player corresponding to the player character is logged into the simulation as well as passage of a unit of time in which a player corresponding to the player character is offline. The associating with a player character at least one progression variable may include receiving a signal from a client computing device indicating a progression variable. The receiving a signal from a client computing device may include receiving a signal transmitted from a device selected from the group consisting of: a game controller, a keyboard, a touch screen, a mouse, and a haptic controller. The increasing or decreasing the value of the progression variable may include increasing a number of inactive advancement points. The increasing or decreasing the value of the progression variable may include increasing a number of active advancement points. The associating with a player character at least one progression variable may include receiving a signal indicating that a player has enabled the progression variable. The indicating that a player has enabled the progression variable may include indicating that a player has paid an in-game fee for such enablement or has accessed a virtual object selected from the group consisting of: a mentor, an expert, a training facility, or a training item. The increasing or decreasing the value of the progression variable may occur substantially continuously as units of time pass. The increasing or decreasing the value of the progression variable may further include receiving a signal from a client computing device indicating that one or more accumulated inactive advancement points are to be expended to increase the progression variable. The progression variable may be selected by default. The default progression variable may be based on one or more factors selected from the group consisting of: player character type, player character level, statistics, faction, characteristics, attributes, skills, powers, or abilities. The method may further include, after the increasing or decreasing the value of the progression variable, rendering a dialogue box on a user interface, the dialogue box enquiring whether a player wishes to continue increasing or decreasing the value of the same or a different progression variable.

In yet another aspect, the invention is directed toward a computer-readable medium, comprising instructions for causing a processor in an electronic device to perform a method of progressing a player character in a simulation, the simulation including a plurality of player characters and non-player characters. The method includes: associating with a player character at least two potential progression variables; after a passage of a unit of time, adding one or more inactive advancement points to a stored number of inactive advancement points; and transmitting a signal to a client computing device, the signal corresponding to the increased number of inactive advancement points associated with the at least two potential progression variables, the signal causing a video renderer or a sound renderer to render an indication of the increased number on a video or an audio device, respectively, or both.

Implementations of the invention may include one or more of the following. The method may further include receiving a signal from the client computing device, the signal indicating which of the two potential progression variables are to have one or more of the inactive advancement points applied.

In yet a further aspect, the invention is directed toward a computer-readable medium comprising a system for progressing a player character in a multiplayer game, the simulation including a plurality of player characters and non-player characters. The medium includes the following modules: a database module for storing data about a plurality of player characters, the stored data at least including information about player character attributes, statistics, characteristics, abilities, powers, or skills; an associating module for associating a player character with a progression variable, the progression variable selected from the stored data information; and an increasing/decreasing module to increase or decrease the value of the progression variable upon the passage of a unit of time.

Implementations of the invention may include one or more of the following. The associating module may further associate the progression variable with a number of inactive advancement points, and the increasing/decreasing module may increase the number of inactive advancement points, or may add a number of inactive advancement points to a number already stored, upon the passage of a unit of time. The associating module may be configured such that the progression variable is selected by default according to one or more of the player character attributes, statistics, characteristics, abilities, powers, or skills. The associating module may be configured such that, upon the accumulation of a threshold number of inactive advancement points, the progression variable may be selected by a player.

In another aspect, the invention is directed toward a computer-readable medium comprising a system for progressing a player character in a multiplayer game, the simulation including a plurality of player characters and non-player characters. The medium includes the following modules: a database module for storing data about a plurality of player characters, the stored data at least including information about player character attributes, statistics, characteristics, abilities, powers, or skills; and an associating module for associating a player character with at least two progression variables, the progression variables selected from the stored data information. The associating module further associates the at least two progression variables with a number of inactive advancement points. An increasing/decreasing module is used to increase a number of inactive advancement points, or add a number of inactive advancement points to a number already stored, upon the passage of a unit of time. Upon the number of inactive advancement points reaching a threshold number, the associating module is configured to request input from a player as to which progression variable or group of progression variables are to be increased or decreased. The at least one group of progression variables may be predefined.

Advantages of the invention may include one or more of the following non-limiting examples. Players can increase an attribute or characteristic of their players by the passage of real-world time, independent of their game play. The attribute to be increased can be chosen by the player or a default attribute can be suggested by the system. Besides player choice, time progression of an attribute may be enabled by numerous mechanisms, including: access to training facilities, items, or certain non-player characters. Other advantages will be apparent from the following description, including the figures and claims.

DETAILED DESCRIPTION

Figure 1:
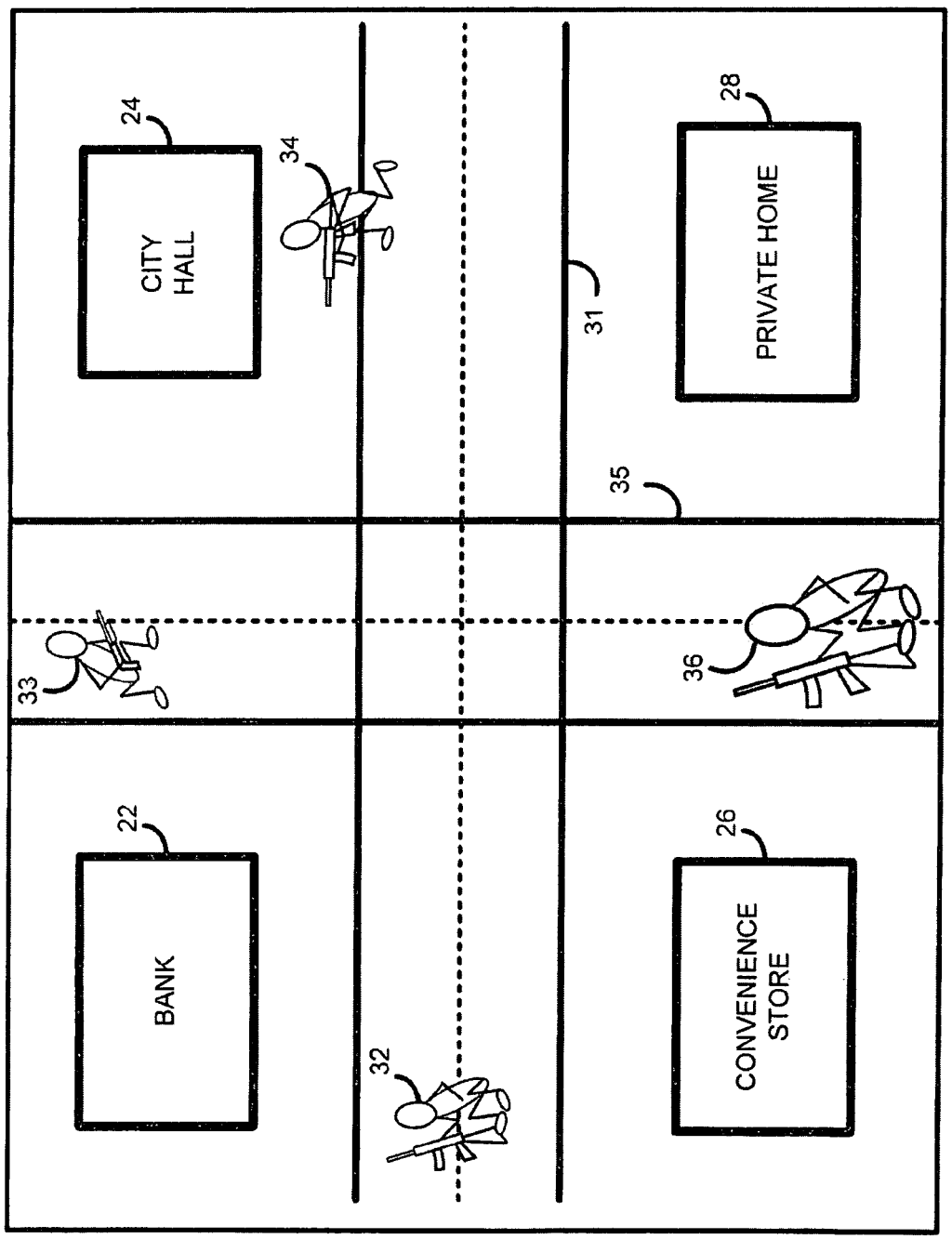
FIG. 1 illustrates an exemplary environment of the simulation, e.g., a multiplayer game environment.

Referring to FIG. 1, an exemplary environment of the simulation, e.g., a multiplayer game, is illustrated. The environment may vary widely, and may be, e.g., a fantasy simulation, a science fiction simulation, a space simulation, a real world simulation, a city simulation, an apocalyptic simulation, a superhero simulation, and so on. The exemplary simulation of FIG. 1 shows a number of characters 32, 33, 34, and 36, and the same are shown traversing various streets 31 and 35 within a game environment 20. In FIG. 1, the characters 32, 33, and 34 are intended to portray player characters, or PCs (in the figures), controlled by players. The same interact with other players' player characters as well as with computer-controlled characters, termed non-player characters or NPCs (in the figures). The character 36 is intended to portray a non-player character, controlled by the simulation or game engine. That is, a non-player character is controlled by the simulation, either at the server level or by the client software, and the same acts in a way dictated by the software instructions and data set for that non-player character. A player may interact with the non-player character 36 by clicking on or otherwise activating the non-player character or by clicking on an icon associated with the non-player character (not shown).

A number of city features are also schematically indicated, such as a bank 22, a city hall 24, a convenience store 26, and a private home 28. The features will vary according to the applicable game environment.

Figure 2:
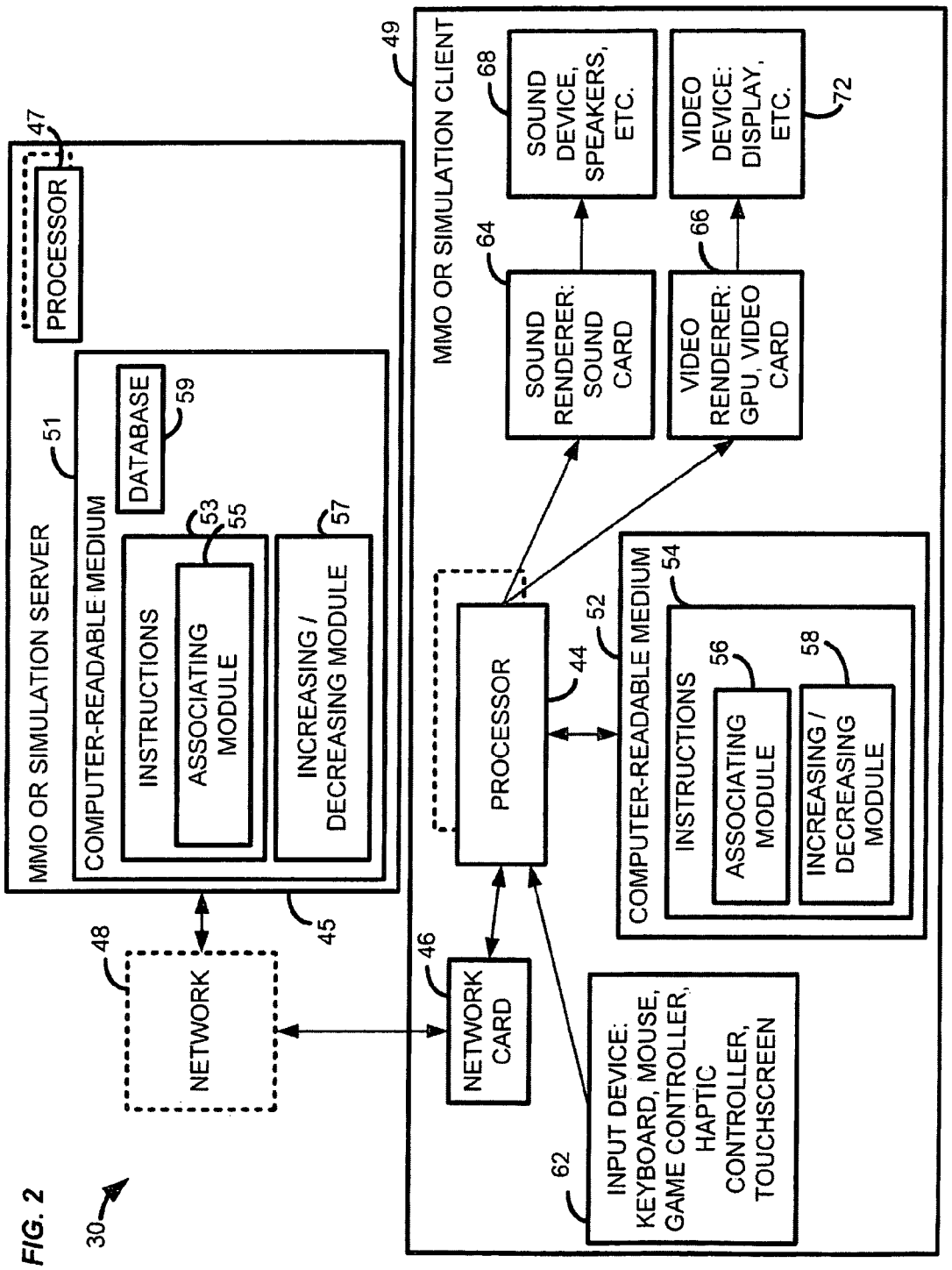
FIG. 2 illustrates a logical diagram of a system that may be employed to implement a simulation such as a multiplayer game, including a client-server architecture.

FIG. 2 illustrates a logical diagram of a system 30 that may be employed to implement a simulation such as a multiplayer game. The system 30 includes an MMO or simulation client computing device 49 and an MMO or simulation server 45 which communicate by way of a network 48. The client computing device 49 includes one or more processors 44 which communicates with the network 48 via a network card 46 or via a network-enabled processor (not shown). The client computing device 49 has client software running which enables communication with the network 48 and server 45.

The client computing device 49 includes at least one input device 62, which may include a keyboard, mouse, game controller, haptic controller, touchscreen, or any other devices which may provide an input to a computer. The client 49 further includes a computer-readable medium 52, such as a hard drive, flash memory, solid state drive, or the like, which stores instructions 54 for the processor 44, including associating module 56 and increasing/decreasing module 58, the functions of which are described below.

The computer-readable medium 52 may also store media files, including graphics files, cinematics files, and the like. These media files may also be streamed when needed from the server 45. In some implementations, certain media files may be downloaded to the client, especially those that are often used, and others may be kept at the server for later streaming, to avoid cluttering the client system. Certain media files are may also be cached at the client system, such as graphics files pertaining to the immediate game locale of the player character.

The system 30 also includes a sound renderer 64, such as a sound card, by which signals pertaining to game sounds may be put in a form suitable for playing on a sound device 68, e.g., computer speakers. Moreover, the system 30 also includes a video renderer 66, such as one or more GPUs or video cards, or both, by which signals pertaining to game video may be put in a form suitable for playing on a video device 72, e.g., a computer display.

The simulation server 45 controls the game, and may be a game server having one or more processors 47 and running a game engine and other components, including a physics engine, user interface, input/output components, and the like. Certain of these components or modules may be implemented on a computer-readable medium 51, which includes a database 59, and instructions 53 for carrying out game processes, including a module 55 for associating player character attributes, statistics, abilities, powers, characteristics, or the like, with progression variables. The computer-readable medium 51 may also include an increasing/decreasing module 57 for increasing or decreasing values of progression variable's and/or a number of inactive advancement points. These components may also be implemented on the client computing device 49 as noted above, or part of the components may be located on the server 45 and part on the client computing device 49. The computer-readable medium 51 may also include media files, including cinematics and cut scenes, for downloading or streaming to client computing devices 49.

Figure 3:
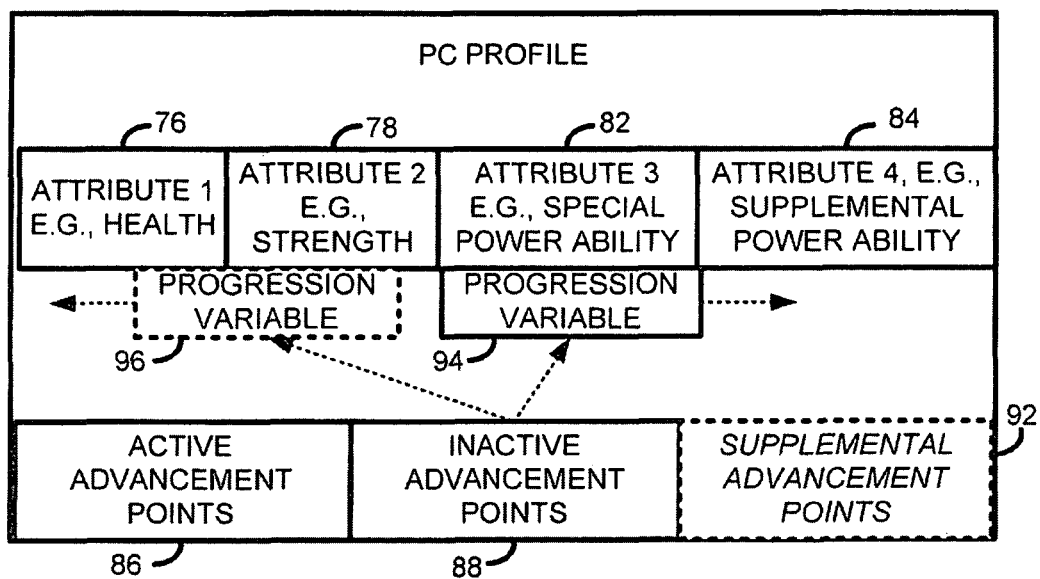
FIG. 3 illustrates an exemplary dataset for a player character profile, indicating how advancement points may be employed to enhance, e.g., character attributes.

FIG. 3 illustrates a data structure 50 corresponding to a player character profile. Only certain attributes are shown in FIG. 3. The elements shown in the structure 50 are employed to illustrate the systems and methods of various implementations in a clear fashion.

Initially it is noted that a player character has defined attributes, characteristics, statistics, and abilities. Player characters may progress in these by a combination of time-based and effort-based progression. For example, a player may choose to increase their player character's "fireball" power. They earn experience through game play by their in-game activities, such as by defeating enemies and completing objectives, which is effort-based progression as noted above, and which results in the accumulation of active advancement points. Players may also earn experience or advance their attributes, characteristics, statistics, and abilities by "time progression", i.e., based only on the elapsing of time, e.g., real-world time, game-time, or the like, and in some implementations this results in the accumulation of inactive advancement points. The player may work their way through the progression in-game, only using active advancement points, or they may wait and allow the progression to accumulate, bit-by-bit, over time, using only inactive advancement points. The accumulation of inactive advancement points may be configured to be slower than the accumulation of active advancement points, for a given amount of offline time and game play time, respectively. Inactive advancement points may accumulate just while a player is offline, or may also accumulate while a player is online.

Inactive advancement points may be employed when the progression is intended to scale in a non-linear fashion. That is, non-linear progression scaling may be employed to simulate a growing power curve of the player character. Because of this, in many implementations, a measure of unmodified time cannot be used since the same cannot match the non-linear curve of the progression. In this way, a larger degree of freedom may be obtained in arbitrarily scaling progression relative to any given unit of time.

Referring back to FIG. 3, the data structure 50 includes a number of registers indicative of various player character attributes (or characteristics or statistics) 76, 78, 82, and 84. In FIG. 3, these are given exemplary values, e.g., attribute 76 corresponds to "health", attribute 78 corresponds to "strength", attribute 82 corresponds to a special power ability, and attribute 84 corresponds to a supplemental power ability. These attributes may be associated with a progression variable 94, such that if the progression variable is set on the attribute, that attribute will increase in value just by the passage of units of time, e.g., by the passage of seconds, minutes, hours, or days, without any particular action on the player's part. In FIG. 3, the progression variable 94 is set on the attribute 84 associated with a special power ability, e.g., the ability to fly. As shown by the progression variable 96 in dotted lines, the progression variable may be set on a number of different attributes, and in some cases, described below, on more than one attribute at a time.

FIG. 3 also illustrates registers for a number of advancement points, e.g., active advancement points 86, inactive advancement points 88, and supplemental advancement points 92. In some implementations, the passage of units of time causes an increase in a number of inactive advancement points, and players may then distribute or spend these inactive advancement points to increase one or more attributes as they desire. Generally, game playing increases a number of active advancement points. Supplemental advancement points may be a special type of inactive advancement point or active advancement point, and depending on implementation, inactive advancement points and/or active advancement points may be used for supplemental advancement. As described below, supplemental advancement allows a player to progress in an area generally unrelated to their main character archetype.

Certain attributes, characteristics, statistics, or abilities that can be increased as a progression variable may have associated with it a threshold number of points which the player must earn in order to complete. Often, the more powerful an upgrade the progression variable grants, the higher the number of points, whether or active or inactive advancement, is required to earn it.

Figure 4:
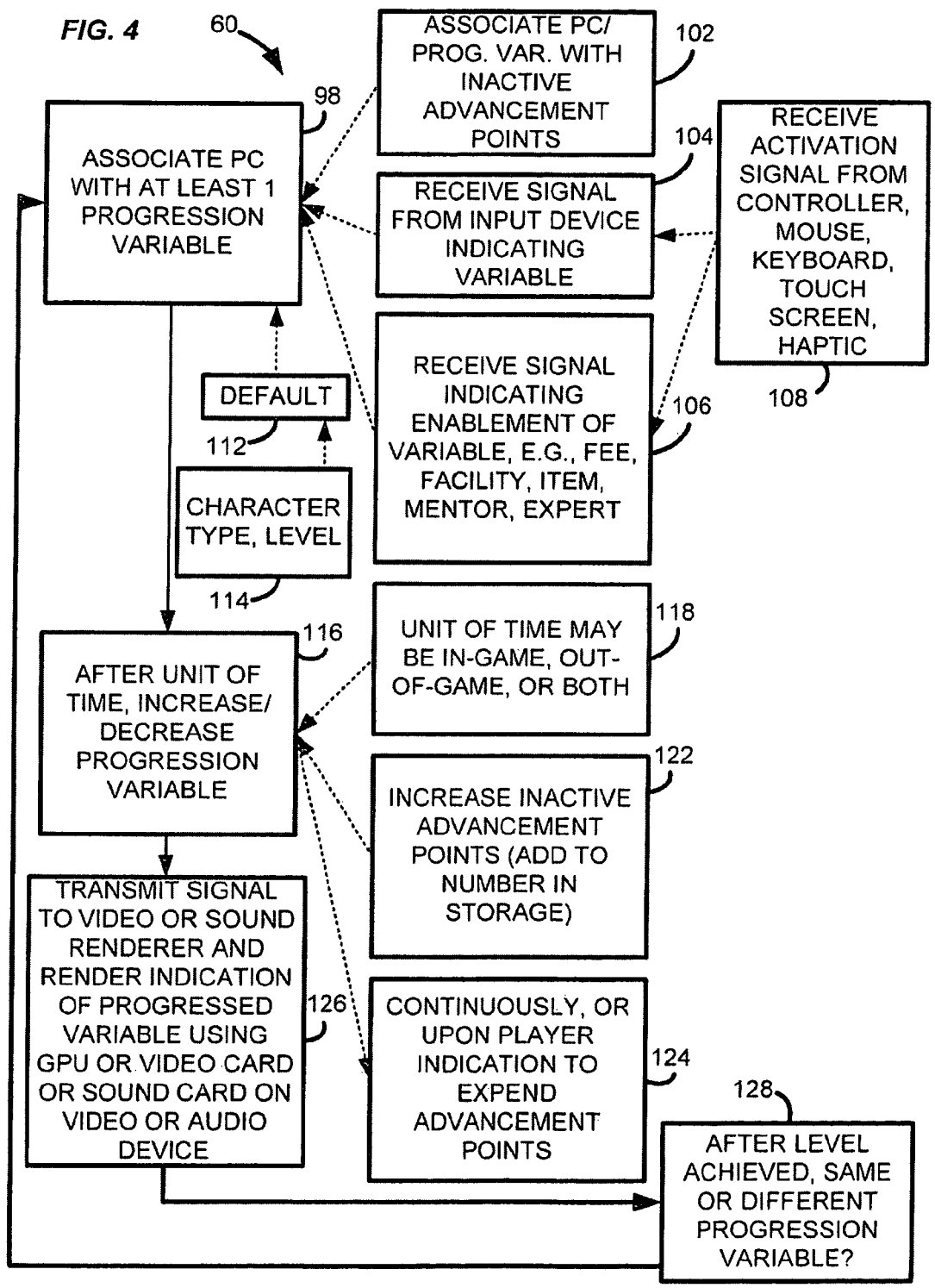
FIG. 4 is a flowchart of a method for implementing an embodiment of the invention, in particular employing the passage of units of time as a way to enhance a progression variable.

FIG. 4 is a flowchart detailing a first embodiment of a method 60 for character progression. A first step is to choose an attribute, ability, characteristic, statistic, power, or skill (collectively in FIG. 4 "attribute") of a player character on which to set the progression, i.e., as the progression variable. From the server standpoint, this step associates a player character with at least one progression variable (step 98).

This step may be accomplished in a number of ways. First, depending on one or more characteristics of the player character, a default value may be set for the progression variable (step 112). The default value may be, for example, a character level, and in particular the default value may be chosen based on characteristics such as the player character type and level (step 114).

In many implementations, the player will choose the progression variable, and this may be accomplished by the server receiving a signal from an input device indicating the progression variable (step 104). This step may further include receiving an activation signal from a game controller, a mouse, a keyboard, a touch screen, a haptic controller, or any other sort of input device (step 108).

Steps 98, 104, and 108 may be accomplished by a player viewing an training item interface window on a user interface, where the player will see a list of available progression variables on which they may train, including: learning new abilities, which in turn makes available a wider variety of combat options, including more tactical and situational options; increasing ability power levels, which increases the effectiveness and may add extra gameplay effects to a specific ability; and training attribute packages, which increases hit point or power pool values, or otherwise increases the effectiveness of related combat abilities.

When the player selects and confirms the choice of progression variable, that choice is set on the player character and all advancement, e.g., inactive advancement points as described below, may begin to go toward that progression variable. If the player has an incomplete attribute in training, the interface may be used to switch their focus to a new progression variable. In this case, the item currently in training keeps its current progression value and the new progression variable is set on the player character. If the new progression variable chosen by the player is one that had been previously worked on and was left in a state of incompletion, the progression may begin again from where it left off.

In general, progression variables may increase or decrease by the passage of units of time. However, as indicated above, in some implementations, a more conveniently quantifiable way to increase progression variables is by accumulation and expenditure of inactive advancement points. That is, once a progression variable is set on a player character, the progression variable may also become associated with the accumulation of inactive advancement points (step 102). That is, inactive advancement points may then begin to accumulate which can automatically or by player direction cause an increase in a progression variable, i.e., the set player character attribute. In this sense, inactive advancement points are used as a "currency" which may accumulate and be expended on desired progression variables. Of course, during game play, active advancement points may also accumulate, and the selected progression variable may increase by virtue of these as well. In some implementations, a player may select one progression variable to increase via accumulated inactive advancement points and another to increase via accumulated active advancement points. Variations of these will be apparent given this teaching; for example, a selected progression variable may require a degree of online participation to complete, putting time progression or the accumulation of inactive advancement points on hold or redirecting the same to a new progression variable.

As noted above, in many implementations, inactive advancement points will be gained in a non-linear fashion in order to meet player expectations regarding the increasing power levels of player characters. In other words, at higher levels, more inactive advancement points may be gained per unit of time than at lower levels. The number of inactive advancement points gained may be a function of many variables, e.g., frequency of player login, desired frequency of player login, amount of game play, contact with the game, subscription frequency, or the like. The time-to-reward ratios may be adjusted to create the proper progression curve, to meet the desires of the developer.

In some implementations, increasing of a progression variable, or accumulation of inactive advancement points, may require an enabling step. For example, the game server may require a step of receiving a signal indicating the enabling of the progression variable (step 106). In some cases, this enabling may be performed by receiving an activation signal as described above in connection with step 104. However, in other cases, the enabling step requires that the player perform some action in-game, such as: give their player character access to a training facility, e.g., one owned by the player character or an organization to which the player character belongs, such as a guild or gym; pay a fee, e.g., a daily fee for access to training facilities; possess a training item, e.g., items enhancing learning or books providing expert knowledge; interact with a non-player character mentor or a high-level or expert non-player character; select a job that the player character performs while the player is offline that defines characteristics to train, or the like.

Following the passage of time, the progression variable is then increased (step 116), or decreased if a decrease represents an enhancement, e.g., represents a timer which must count down before a power may be reused. The elapsed time may be in-game, offline, or both (step 118). Increasing or decreasing a progression variable may be accomplished by increasing a number of stored inactive advancement points (step 122), e.g., one inactive advancement point per hour. The increase or decrease of the progression variable may also occur continuously, with whatever granularity desired by the developer, e.g., one increase per hour, or may occur upon player indication, e.g., to expend inactive advancement points (step 124). A signal is then transmitted to a video or sound renderer, such as one or more GPUs or video cards or a sound card, to render an indication of the increased progression variable (step 126). The rendering may occur, e.g., on a video or audio device or both. In many implementations, it may be rendered as part of the training item user interface described above. If the increased progression variable results in a particular milestone, such as the achievement of a new level for the ability, characteristic, or attribute, then the player may be queried as to whether they wish to continue to increase the current progression variable or a different progression variable (step 128).

Figure 5:
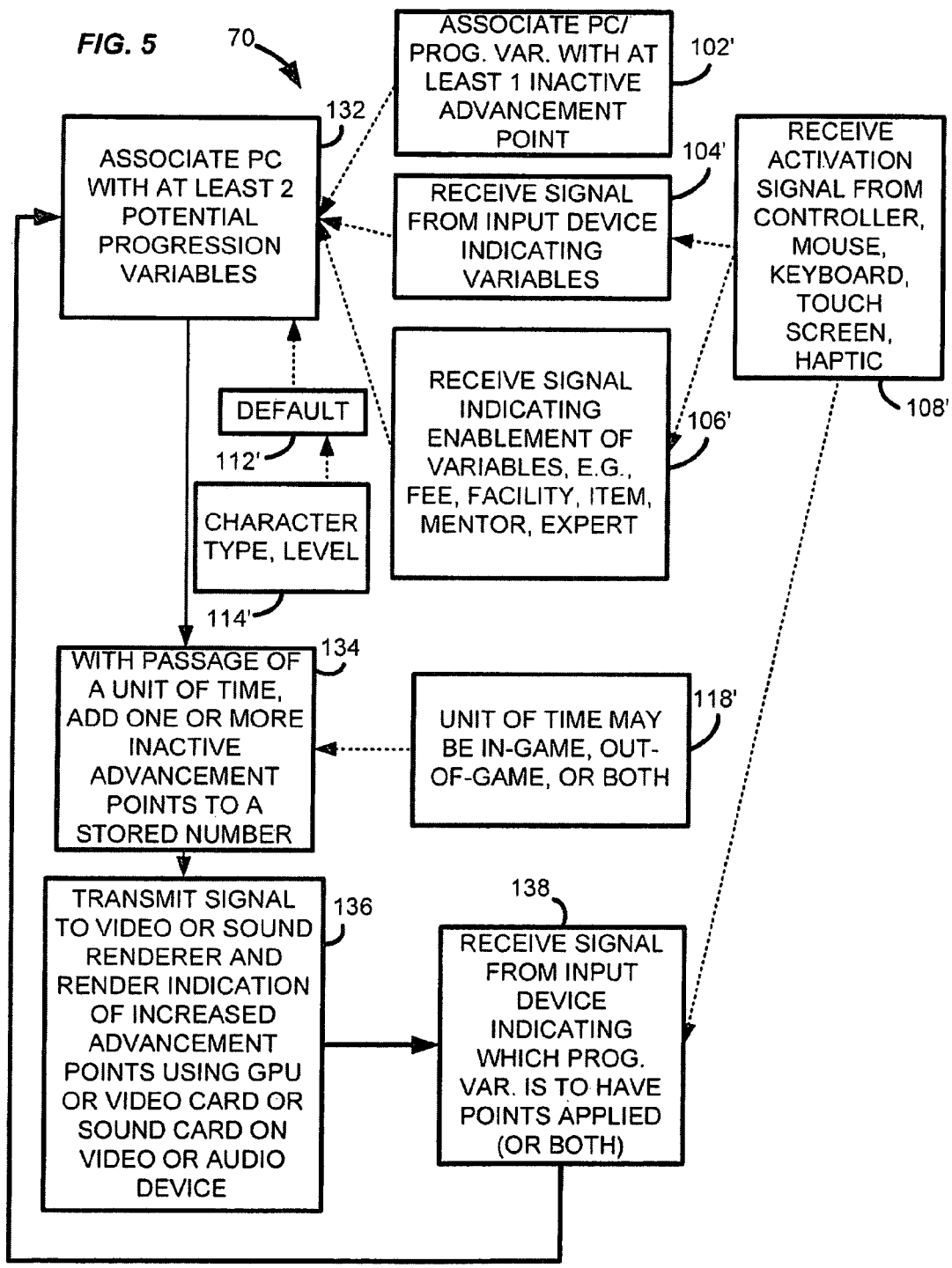
FIG. 5 is a flowchart of a method for implementing another embodiment of the invention, in particular employing accumulation and storage of advancement points to enhance one of at least two potential progression variables.

FIG. 5 is a flowchart of another method 70 that may be implemented for character progression. In this embodiment, inactive advancement points accumulate and are stored, and a player selects which progression variable on which to apply the pre-stored inactive advancement points.

A first step is to associate a player character with at least two potential progression variables (step 132). That is, more than one progression variable may be potentially increased for a given player character. This step need not require that the progression variables be pre-selected for a given time-progression; rather, that a player character have at least two potential progression variables that may be progressed. Steps 102', 104', 106', 108', 112', 114', and 118' are similar to their unprimed counterparts in FIG. 4 and their description is not repeated here.

Following a passage of units of time, a next step is to add one or more inactive advancement points to a stored number (step 134). A rendering is performed of the increased number of inactive advancement points, such as on the training interface described above, although any video or audio rendering may be performed (step 136). The rendering may be performed in a way similar to that described above with respect to step 126 of FIG. 4. A next step is to receive a signal from an input device indicating to which progression variable a given number of stored inactive advancement points are to be applied (step 138). One progression variable may receive all stored inactive advancement points, or a number of progression variables may receive partial numbers of stored inactive advancement points. In the latter case, the distribution may be by player choice, by choice of the simulation or MMO, or a combination of both. In some implementations, the distribution may be set by a particular emphasis of the player; for example, if a player which to increase their player character's flying ability, they may choose to always increase progression variables pertaining to a flying power, a stamina attribute, a weight characteristic, and the like. The step 138 may also include a step of receiving an activation signal from a controller (step 108').

What have been described are systems and methods for altering one or more characteristics of a digital object or profile, such as developing a character in an online computer game. Using the systems and methods, a user of a computer system, e.g., a player of a computer game, can control how digital objects develop over time both through the direct use of that object by the user as well as by the passage of units of time.

One implementation of the system and method includes one or more programmable processors and corresponding computer system components to store and execute computer instructions, such as to provide the server and client systems to operate and interact in the online game environment and to monitor and control data about the player characters in the game environment. The modules, components, or portions thereof, may be stored on one or more other servers, i.e., there is no requirement that all components be located on a common server, and in some cases certain components will be located on client computing devices.

It is noted that in this description, player character attributes, skills, characteristics, statistics, abilities, powers, and the like, are treated equally, and the invention may be equally well-applied to progress any of these. In some cases, this description may discuss one or another of these without specifying others, but unless noted, this is not to be understood as an exclusion of the others.

Numerous additional variations and implementations are also possible. For example, the progression system could be applied to other types of games, fantasy, science fiction, or offline. The progression system could also be applied to non-character game objects, such as player items, e.g., allowing the character to craft items while the player is offline, or environment items, e.g., allowing a town or building to develop and change over time. In another example, the progression need not be positive, but could also be negative, e.g., character attributes may gradually degrade over time through age or lack of use. A selected progression variable may also carry an increased risk for some negative consequence, e.g., item damage or loss of time progression benefits, while having a higher potential time progression return. Increasing the attributes relevant to a particular ability may result in an increase of the minimum value of the ability's effect range, along with an increase of an average value of the game play effect. Restrictions may be enforced on certain progression variables. For example, a player may be restricted from advancing any one ability, attribute, or characteristic too far beyond the others.

While the generic passage of a unit of time has been disclosed above, the time variable may pertain to time played, time subscribed to, time purchased, time earned, or the like. In this way, certain implementations of the invention may act to incentivize players to continue a certain behavior, e.g., subscription renewal, because of the progression equity the player has accrued through the use of the system.

When a player character has earned enough active advancement points or inactive advancement points through game play or time progression to satisfy the cost of the current training item, the benefits of the item may be immediately granted to the player character. For example, the ability may be available for use or upgraded to a next power level, or the attributes increased. In some cases, if a player has earned enough points to cover the cost of a training item through inactive advancement points, e.g., while offline, the accumulation of inactive advancement points may be paused, and the player may be required to log in to complete the training to being earning inactive advancement points again. In this way, the player may be incentivized to continue subscribed game play. Alternatively, such points may continue to accumulate in a buffer or point bank for later expenditure.

Once training of an item or progression variable is completed, that item may be unset from training on the player character, and the player character may select a new progression variable; in some implementations, the system may select a new progression variable by default, e.g., the next level of the progression variable for which a level was gained. If any active advancement points are earned before the player has had a chance to select a new progression variable, the points may accrue in a buffer and may be immediately applied to the next progression variable the player selects; in some implementations, any inactive advancement points that would have been granted by the system may be lost if the player has not chosen a progression variable.

Player characters may progress in elements beyond those that are associated with their particular archetypical powers and abilities by training in supplemental advancement areas, including: increasing effectiveness of game play or state effects; gaining special powers not available to the player character's archetypical powers and power sources; situational specific benefits, e.g., water breathing; and non-gameplay benefits, e.g., special visual effects. These supplemental advancements may be accessed in some implementations by supplemental advancement points as discussed above, which may be obtained in one or more of the ways above, e.g., by game play as a reward for content consumption. For example, by researching sound waves emanating from a device found by a player character, the player character may obtain an increase in an ability to attack via a sonic power.

As abilities, attributes, characteristics, and associated power levels increase, the increases may be made visually apparent to the player by the way the increases are rendered.

For example, attacks with increased abilities may be rendered with stronger and more vivid colors, with more expansive effects, or both. For example, in addition to increasing the range of an attack, an increased attack power may cause the rendering of new and special effects associated with the attack. As a specific example, a sonar beam attack ability may, at an increased level, appear to have the player character emanate sound waves rippling outward upon initiation of an attack. Additional variations will be apparent depending on the nature of the game or system.

It will be apparent to one of ordinary skill in the art, given this teaching, that variations in the above description will be encompassed by the scope of the claims. Accordingly the scope of the invention is to be limited only by the claims appended hereto, and equivalents thereof.

The invention claimed is:

1. A massively multiplayer online (MMO) game server system configured to simultaneously support thousands of players in a game environment, the MMO game server system comprising:
    a processor; and
    a non-transitory computer-readable medium, comprising instructions for causing the processor to perform a method of progressing player characters in a simulation, the simulation including a plurality of player characters and non-player characters, the method comprising:
        maintaining a database of player character data for all players in the game environment, the player character data comprising data associated with player character attributes, statistics, characteristics, and abilities;
        simultaneously communicating with a plurality of remote client computing devices by way of a network, to carry out game processes at the MMO game server system for the plurality of remote client computing devices, and to associate player character data with progression variables and advancement points for each of the plurality of player characters;
        continuously updating the database to increase or decrease progression variables and advancement points for all players in response to simultaneous game playing involving communication with the plurality of remote client computing devices, and in response to passage of real time;
        associating with a player character a number of active advancement points and a number of inactive advancement points, the active advancement points increasing in response to in-game activities of the player character;
        receiving a selected attribute, from a plurality of attributes of the player character, for use as a progression variable, the selected attribute chosen by a user;
        after a passage of a unit of real time, increasing the number of inactive advancement points, wherein accumulation of the inactive advancement points is based only on elapsing of real time;
        expending at least a portion of the number of inactive advancement points and at least a portion of the number of active advancement points to increase a value of the progression variable; and
        transmitting a signal to a client computing device, corresponding to the increased progression variable, the signal for causing a rendering of an indication of the increased progression variable on a video or an audio device, respectively, or both.

2. The MMO game server system of claim 1, wherein a signal associated with the signal for causing a rendering is transmitted to a video renderer including a graphics processing unit or a video card.

3. The MMO game server system of claim 1, wherein the passage of a unit of real time includes passage of a unit of real time in which a player corresponding to the player character is logged into the simulation.

4. The MMO game server system of claim 1, wherein the passage of a unit of real time includes passage of a unit of real time in which a player corresponding to the player character is offline.

5. The MMO game server system of claim 1, wherein the passage of a unit of real time includes passage of a unit of real time in which a player corresponding to the player character is logged into the simulation and passage of a unit of real time in which a player corresponding to the player character is offline.

6. The MMO game server system of claim 1, wherein the expending at least a portion of the number of inactive advancement points and at least a portion of the number of active advancement points to increase a value of the progression variable includes receiving a signal from a client computing device indicating the progression variable.

7. The MMO game server system of claim 6, wherein the receiving a signal from a client computing device includes receiving a signal transmitted from a device selected from the group consisting of: a game controller, a keyboard, a touch screen, a mouse, and a haptic controller.

8. The MMO game server system of claim 1, wherein the expending at least a portion of the number of inactive advancement points and at least a portion of the number of active advancement points to increase a value of the progression variable includes automatically expending the number of inactive advancement points once the number reaches a threshold number.

9. The MMO game server system of claim 1, wherein the expending at least a portion of the number of inactive advancement points and at least a portion of the number of active advancement points to increase a value of the progression variable includes receiving a signal indicating that a player has enabled the progression variable.

10. The MMO game server system of claim 9, wherein the indicating that a player has enabled the progression variable includes indicating that a player has paid an in-game fee for such enablement or has accessed a virtual object selected from the group consisting of: a mentor, an expert, a training facility, or a training item.

11. The MMO game server system of claim 1, wherein increasing the value of the progression variable occurs substantially continuously as units of real time pass.

12. The MMO game server system of claim 1, wherein the increasing a value of a progression variable further comprises receiving a signal from a client computing device indicating that one or more accumulated inactive advancement points are to be expended to increase the value of the progression variable.

13. The MMO game server system of claim 1, further comprising, after the increasing the value of the progression variable, rendering a dialogue box on a user interface, the dialogue box enquiring whether a player wishes to continue increasing the value of the same or a different progression variable.

14. A massively multiplayer online (MMO) game server system configured to simultaneously support thousands of players in a game environment, the MMO game server system comprising:

a processor; and a non-transitory computer-readable medium, comprising instructions for causing the processor to perform a method of progressing player characters in a simulation, the simulation including a plurality of player characters and non-player characters, the method comprising:

maintaining a database of player character data for all players in the game environment, the player character data comprising data associated with player character attributes, statistics, characteristics, and abilities;

simultaneously communicating with a plurality of remote client computing devices by way of a network, to carry out game processes at the MMO game server system for the plurality of remote client computing devices, and to associate player character data with progression variables and advancement points for each of the plurality of player characters;

continuously updating the database to increase or decrease progression variables and advancement points for all players in response to simultaneous game playing involving communication with the plurality of remote client computing devices, and in response to passage of real time;

associating with a player character at least two potential progression variables, the player character having a plurality of attributes, each of said at least two potential progression variables being monotonically increasing or decreasing, where at least two of the attributes are selected by a user or are selected for the user for use as the at least two potential progression variables;

after a passage of a unit of real time, adding one or more inactive advancement points to a stored number of inactive advancement points, wherein accumulation of the inactive advancement points is based on elapsing of real time;

transmitting a signal to a client computing device, the signal corresponding to the increased number of inactive advancement points associated with the at least two potential progression variables, the signal causing a video renderer or a sound renderer to render an indication of the increased number on a video or an audio device, respectively, or both; and receiving a signal from the client computing device, the signal indicating which of the two potential progression variables are to have one or more of the inactive advancement points applied.

* * * * *